(12) United States Patent
Watson

(10) Patent No.: US 11,713,550 B1
(45) Date of Patent: Aug. 1, 2023

(54) ADJUSTABLE SHOVEL

(71) Applicant: Vision to Finish, LLC, Racine, WI (US)

(72) Inventor: Eddie J. Watson, Racine, WI (US)

(73) Assignee: Vision to Finish, LLC, Racine, WI (US)

( * ) Notice: Subject to any disclaimer, the term of this patent is extended or adjusted under 35 U.S.C. 154(b) by 0 days.

(21) Appl. No.: 18/086,843

(22) Filed: Dec. 22, 2022

(51) Int. Cl.
*E01H 5/02* (2006.01)
*A01B 1/02* (2006.01)

(52) U.S. Cl.
CPC .............. *E01H 5/02* (2013.01); *A01B 1/022* (2013.01); *A01B 1/026* (2013.01)

(58) Field of Classification Search
CPC .......... E01H 5/02; A01B 1/022; A01B 1/026; B62B 1/147
USPC ................................... 294/54.5; 37/265, 285
See application file for complete search history.

(56) References Cited

U.S. PATENT DOCUMENTS

| | | | | |
|---|---|---|---|---|
| 1,683,732 A | * | 9/1928 | Selin | E01H 5/02 294/59 |
| 2,388,985 A | | 11/1945 | Martin | |
| 2,460,560 A | | 2/1949 | Williams | |
| 2,772,490 A | * | 12/1956 | Hnastchcnko | E01H 5/02 37/271 |
| 2,846,785 A | | 8/1958 | Underwood | |
| 3,043,033 A | * | 7/1962 | Odell | E01H 5/02 298/5 |
| 3,748,761 A | * | 7/1973 | Chetwynde | E01H 5/02 294/59 |
| 3,833,262 A | * | 9/1974 | Tasse | B62B 1/24 298/3 |
| 4,787,661 A | * | 11/1988 | Rutledge | B25G 1/04 294/58 |
| 4,804,219 A | | 2/1989 | Berg | |
| 5,048,206 A | | 9/1991 | Jones | |
| 5,271,169 A | | 12/1993 | Konsztowicz | |
| 5,581,915 A | | 12/1996 | Lobato | |
| 5,906,060 A | | 5/1999 | Tonry | |
| 6,592,160 B1 | | 7/2003 | Nicolay et al. | |
| 9,204,587 B2 | * | 12/2015 | Cordeiro | A01B 1/026 |
| 10,106,941 B1 | * | 10/2018 | Nam | E01H 5/02 |
| 2004/0222652 A1 | | 11/2004 | Colville | |
| 2020/0277744 A1 | * | 9/2020 | Lyons | E01H 5/02 |

FOREIGN PATENT DOCUMENTS

EP          1655111          5/2006

* cited by examiner

Primary Examiner — Dean J Kramer

(57) ABSTRACT

An adjustable shovel apparatus and method is disclosed which includes a frame assembly and a shovel assembly adjustable in relation to the frame assembly. The shovel assembly is in slidable communication with the frame assembly and can be repositioned in multiple configurations in relation to the frame assembly to allow a user to clear snow or debris of varying heights to be a surface without the need to lift and throw it.

6 Claims, 6 Drawing Sheets

ADJUSTABLE SHOVEL

BACKGROUND OF THE INVENTION

The present invention relates in general to snow shoveling devices. Anyone who has lived in a climate with snowfall has experienced to need to shovel snow after it has accumulated on a deck, driveway, sidewalk, or other such surface. Snow left on these surfaces poses safety risks for individuals. In particular, individuals with health concerns such as those with physical injuries and the elderly are at a greater risk of further concerns since they are often unable to remove snow utilizing traditional snow removal devices. For example, a regular snow shovel requires an individual to repeatedly lift and throw snow which can be too heavy or difficult for an individual, or can actually cause injury and/or exacerbate an existing injury, due in part to the strenuous repetitive movements involved and accompanying strain applied to the body, including the back. Another traditional method includes the use of a snow blower; however these devices are often unusable for individuals with health concerns as they require sufficient strength to operate, extra space in a garage or storage area when not in use, requires maintenance, and are difficult to move and utilize on decks and surfaces non-accessible to the storage area of the blower. A compact solution is needed which allows an individual to easily clear surfaces covered with snow or debris without the need to lift and throw the snow, thereby greatly reducing physical strain on an individual.

SUMMARY OF THE INVENTION

The invention relates, in one embodiment, to an apparatus configured to an adjustable shovel apparatus which includes a frame assembly and a shovel assembly, wherein a section of the shovel assembly is slidable along the frame assembly and a different section of the shovel assembly is movably attached to the frame assembly.

The invention relates, in another embodiment, to an adjustable shovel apparatus including a frame assembly with a shovel assembly attachment portion, a first foot, and a second foot, where the first foot and the second foot are attached to the frame assembly and are configured to communicate with a surface. The apparatus further includes a shovel assembly with a blade, a handle, and at least one frame assembly attachment portion. The shovel assembly is configured to be in slidable communication with the frame assembly and the at least one frame assembly attachment portion removably secures the shovel assembly to the frame assembly in a position in relation to the first foot. The shovel assembly can be adjusted to a plurality of positions in relation to the frame assembly, thereby allowing the blade of the shovel assembly to be adjusted to different heights in relation to the first foot.

The invention relates, in another embodiment, to a method of adjusting an adjustable shovel apparatus with a shovel assembly connected to, and in slidable communication with, a frame assembly including the steps of detaching a section of the shovel assembly in a first position from the frame assembly, moving the shovel assembly in relation to the frame assembly to a second position, and reattaching the section of the shovel assembly to the frame assembly in the second position.

DETAILED DESCRIPTION OF THE INVENTION

Figure 1:
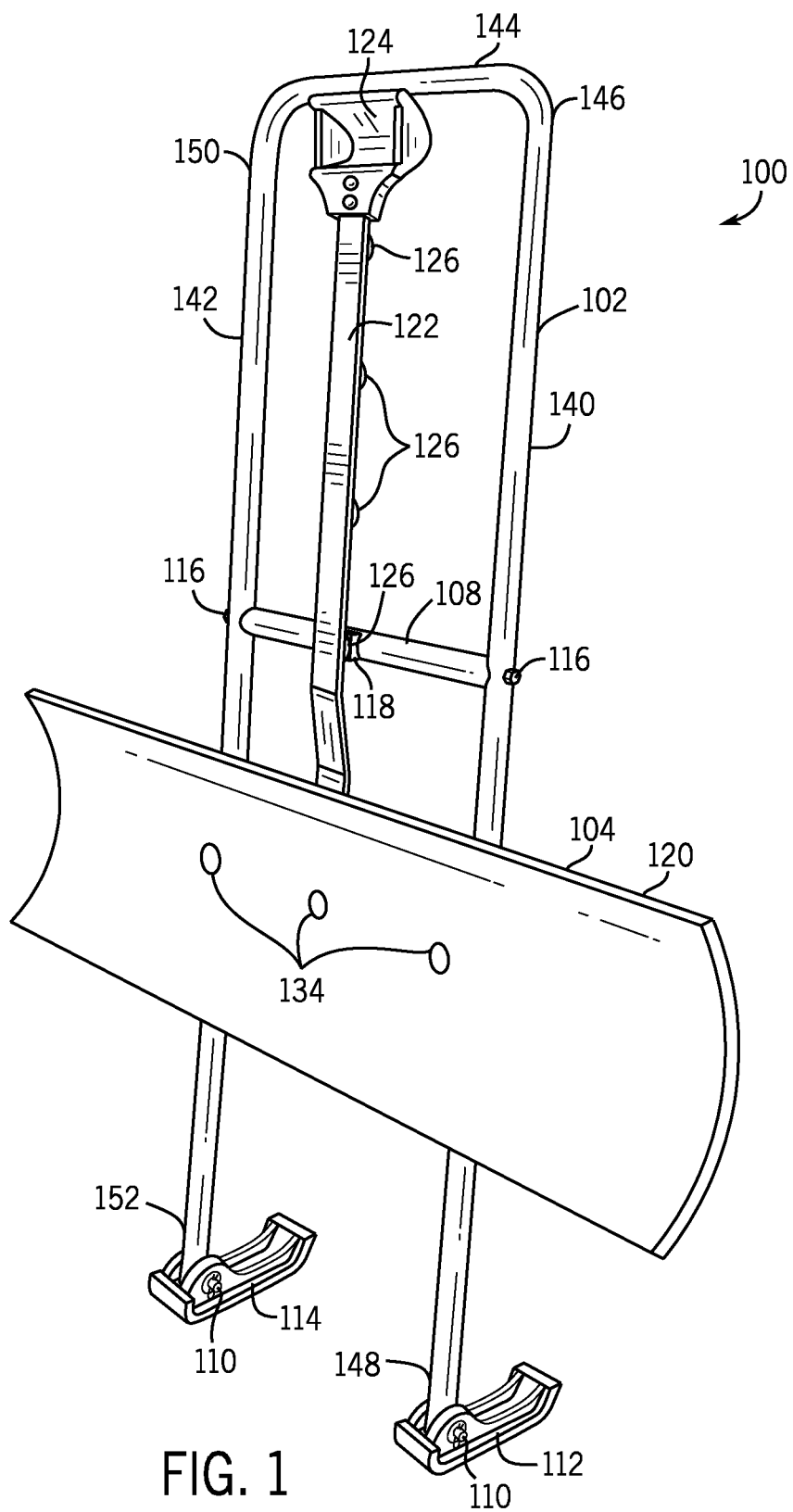
FIG. 1 is a perspective view of an embodiment of the present invention.

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified. Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. As used herein, the term "fastener" is intended to mean a screw, bolt, nail, rivet, anchor, pin, and any other type used to secure one object to another (permanently or removably).

An adjustable shovel apparatus and method will now be described with references in FIGS. 1-6. Turning to the drawings, where the reference characters indicate corresponding elements throughout the several figures, attention is first directed to FIGS. 1-4, where a front perspective view, rear perspective view, rear view, and right side view of an embodiment of the adjustable shovel is shown, illustrating its composition and the apparatus is generally indicated by reference character 100. Adjustable shovel 100 comprises a frame assembly 102 and a shovel assembly 104 in communication with frame assembly 102, wherein a section of shovel assembly 104 is in slidable communication with frame assembly 102 and a different section of the shovel assembly 104 is movably attached to frame assembly 102. Shovel assembly 104 is configured to secure to frame assembly 102 in a plurality of locations.

Frame assembly 102 comprises a first extension 140 with a first end 146 and a second end 148, a second extension 142 with a first end 150 and a second end 152, and a third extension 144. First extension 140 and second extension 142 are positioned parallel to each other while one end of third extension 144 is secured to first end 146 of first extension 140 and the other end of third extension 144 is secured to first end 150 of second extension 142. Third extension 144 is located perpendicular to first extension 140 and second extension 142. Frame assembly 102 further comprises a first foot 112 rotatably connected to second end 148 of first extension 140 via a first fastener 110. In addition, frame assembly 102 further comprises a second foot 114 rotatably connected to second end 152 of second extension 142 via a first fastener 110. First foot 112 and second foot 114 are configured to provide traction and to allow frame assembly 102 (and thus shovel assembly 104) to slide across a surface when pushed by a user so that shovel assembly 104 can move a quantity of snow. In the current embodiment, first foot 112 and second foot 114 are at least partially rotatable to allow a user to position frame assembly 104 at varying angles in relation to a surface that is comfortable for them. To push snow a user would grasp third extension 144, first extension 140, and/or second extension 142 and shovel 100 along the surface. Further, first foot 112 and second foot 114 are generally rectangular shaped resembling a "ski" and made from metal or plastic, but other shapes and material compositions may be utilized for the same purpose.

Frame assembly apparatus 104 further comprises a crossbar 108 that is parallel with third extension 144 and connected on one end to first extension 140 via a second fastener 116 and connected on the other end to second extension 142 by another second fastener 116 and configured to add, in part, structural support to frame assembly 104 as well as provide a location to secure shovel assembly 104 into a position/location. Crossbar 108 further comprises a shovel assembly attachment portion 118 configured to removably attach to shovel assembly 104. In the current embodiment cross bar 108 is cylindrical, made of metal, and about centrally located along, and perpendicular to, the length of first extension 140 and second extension 142, however crossbar 108 may be located at other locations along the length of first extension 140 and second extension 140 as well as may be composed of other materials and shapes as desired. In the current embodiment shovel assembly attachment portion 118 is centrally located along crossbar 108 and generally square shaped, however other locations along crossbar 108 are contemplated as well as other shapes which accommodate shovel assembly 104 as long as there is enough surface area to securely removably attach portion 118 to shovel assembly 102. Further, shovel assembly attachment portion 118 could be attached to another element of frame assembly 102, such as on third extension 144.

Figure 2:
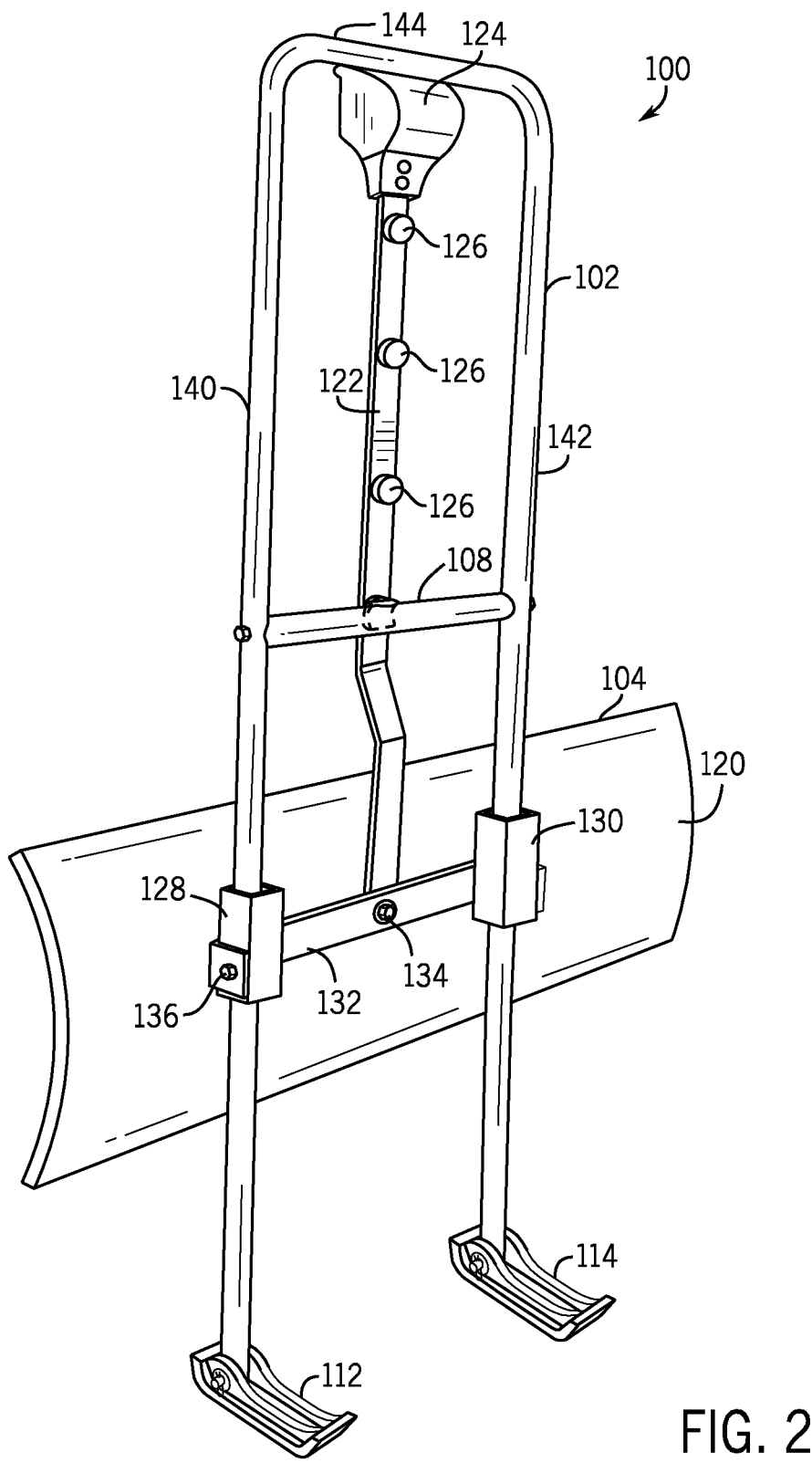
FIG. 2 is a rear perspective view of an embodiment of the present invention.
Figure 3:
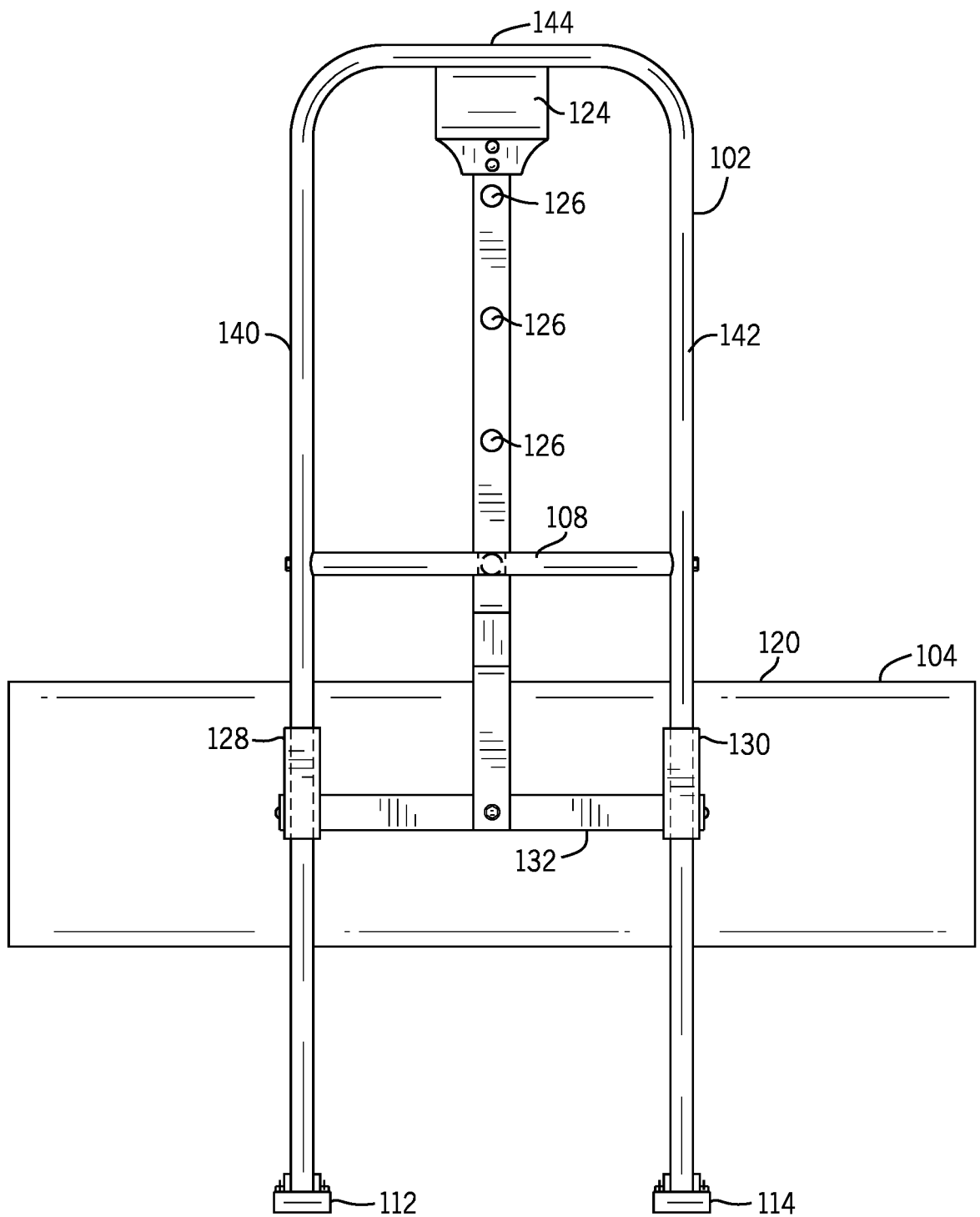
FIG. 3 is a rear view of an embodiment of the present invention.

Turning to FIG. 2, shovel assembly 104 comprises a blade 120, a rail 132, a handle 122, a grip 124, a first cylinder 128 and a second cylinder 130, where blade 120 is configured to push snow or debris. In the current embodiment, blade 120 is generally rectangular shaped and curved along its longest dimension ("C" shaped) and made of metal, however other shapes and configurations are contemplated that are useful for moving snow or debris. Blade 120 is attached to rail 132 by at least one third fastener 134 (3 in the current embodiment), wherein rail 132 is preferably centrally located on the rear surface along the apex of the curvature of blade 120 and configured to attach to one end of handle 122 via at least one of the third fastener 134. Handle 122 is attached to a grip 124 on its other end, wherein grip 124 is used to move shovel assembly 104 along first extension 140 and second extension 142 of frame assembly 102 in order to change the desired height of blade 120. While handle 122 is preferably connected to the center of rail 132 along its length, it can be located in a different location along rail 132 if desired. Further, one end of rail 132 attaches to first cylinder 128 via a fourth fastener 136 and the other end of rail 132 attaches to second cylinder 130 via another fourth fastener 136. First cylinder 128 and second cylinder 130 are each hollow along their length and open on each end. Further, first cylinder 128 and second cylinder 130 each have a square cross-sectional shape in the current embodiment but can be other shapes such as circular, triangular, or hexagonal if desired. Further, first cylinder 128 and second cylinder are preferably made of metal or plastic, but other materials may be utilized. First cylinder 128 is configured to slide over and along the length of first extension 140 between crossbar 108 and first foot 112 and second cylinder 130 is configured to slide over and along the length of second extension 142 between crossbar 108 and second foot 114, thereby allowing the height of blade 120 in relation to first foot 112 and second foot 114 to be adjusted. First foot 112 is configured to prevent first cylinder 128 from sliding off of first extension 140 and second foot 114 is configured to prevent second cylinder 130 from sliding off the end of second extension 142. While first cylinder 128 and second cylinder 130 each secure to rail 132 by a fourth fastener 136, it is contemplated that first cylinder 128, second cylinder, 130, and rail 132 may be formed integral with each other or secured together without fasteners. In addition, first fastener 110, second fastener 116, third fastener 134, and fourth fastener 136 may be the same type of fastener and size or may be different.

Figure 4:
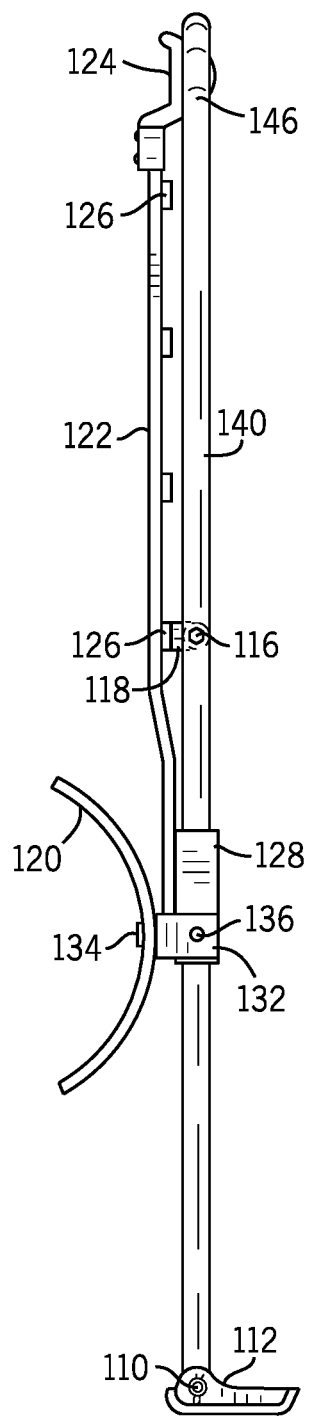
FIG. 4 is a right side elevational view of an embodiment of the present invention.

Turning to FIGS. 1 and 4, shovel assembly 104 further comprises at least one frame assembly attachment portion 126 fixed to handle and faced to communicate with the shovel assembly attachment portion 118 on frame assembly 102. In the current embodiment frame assembly attachment portion 126 include a magnet and contains four portions 126 aligned along the length of the back of handle 122 configured to removably secure to a magnet included as part of shovel assembly attachment portion 118. Each frame assembly attachment portion 126 allows blade 120 to be set at a different distance from first foot 112 and second foot 114, wherein a user can adjust the height of blade 120 by grasping grip 124 and pulling handle 122 away from frame assembly 102, thereby disengaging frame assembly attachment portion 126 from shovel assembly attachment portion 118 and then sliding shovel assembly 104 along first extension 140 and second extension 142 (utilizing first cylinder 128 and second cylinder 130) to a new desired position and resecuring shovel assembly 104 to frame assembly 102 by securing a frame attachment portion 126 corresponding to the new blade 120 location to shovel attachment portion 118. While frame assembly attachment portion 126 is a magnet, it could also be other knows methods of removable attachment including but not limited to a post and hole, clamp, a spring button/switch, a removable fastener, or quick-release configuration.

Figure 5:
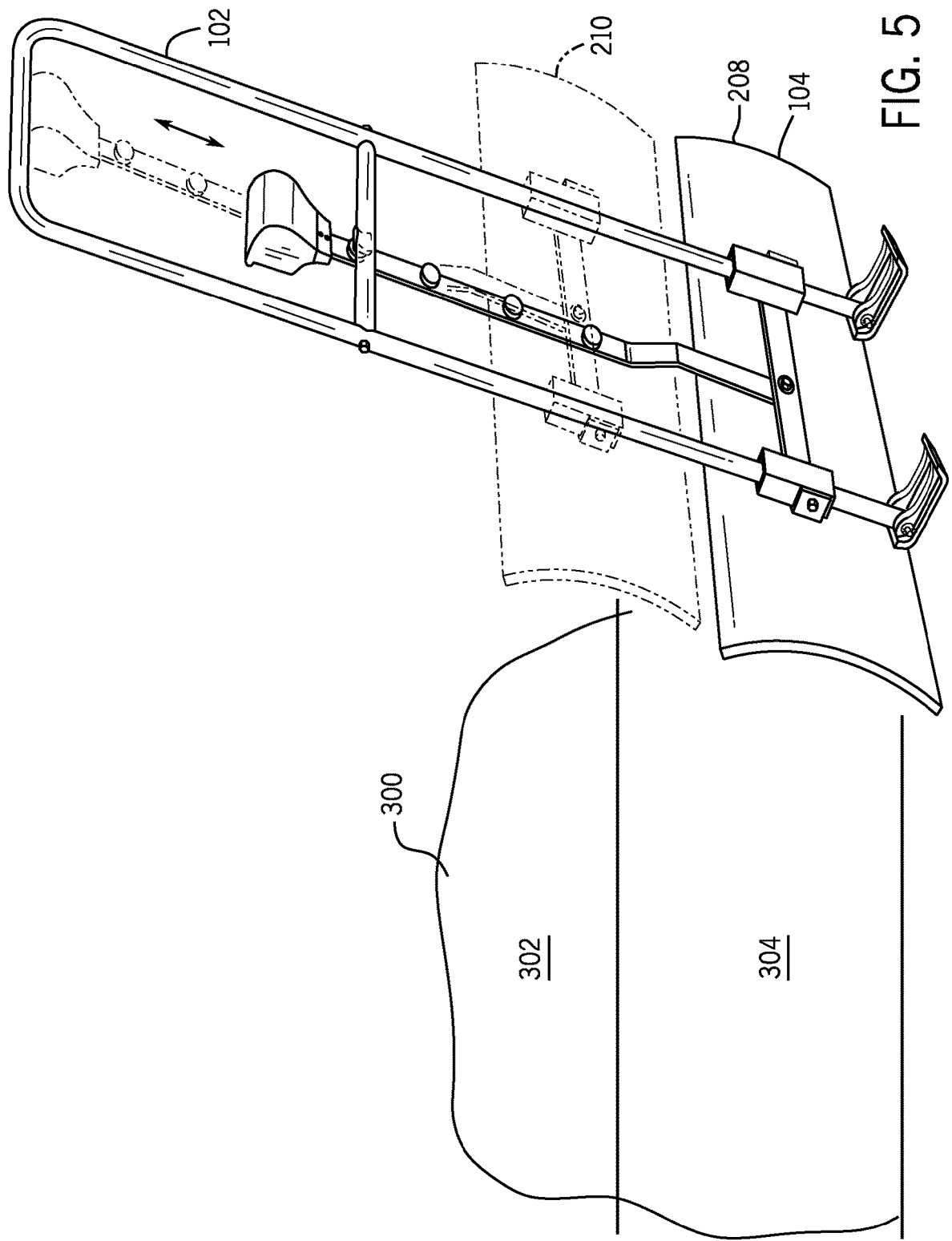
FIG. 5 is a is a rear perspective view of an embodiment of the present invention illustrating how shovel assembly 104 can be repositioned during use.

Turning to FIG. 5 a rear perspective view of an embodiment of the present invention illustrating how shovel assembly 104 can be repositioned during use is shown. Adjustable shovel 100 allows a user to move snow or debris 300 from a surface without the need to lift or throw the snow. Further, when accumulated snow or debris 300 is taller than the height of blade 120 in a first position 208, shovel assembly 104 can be adjusted upward to a second position 210 and then pushed toward a top layer 302 of a snow mound 300 to be pushed away from a surface. Next, shovel assembly 104 is then positioned lower to first position 208 and again used by a user to push away a remaining bottom layer 304 of snow 300 from the surface. In operation, when shovel assembly 104 is in second position 210 and pushing top layer 302 of snow 300, frame assembly 102 is pushed by a user through bottom layer 304 of snow 300 and frame assembly 102 may generally push some of bottom layer 304 as well. While in the current embodiment there are two positions described, with the location of the top of blade 120 in second position 210 being about 12 inches from the location of the top of blade 120 in the first position 208, shovel assembly 104 may be positioned in a plurality of positions in relation to frame assembly 102 to accommodate snow mounds of varying heights. In normal operation, a user will start with the tallest position of blade 120 first, and then lower shovel assembly 104 in relation to at least first foot 112 of frame assembly 102 to subsequent positions after each snow or debris layer is moved until first position 208 is reached and the surface is clear of snow/debris.

Figure 6:
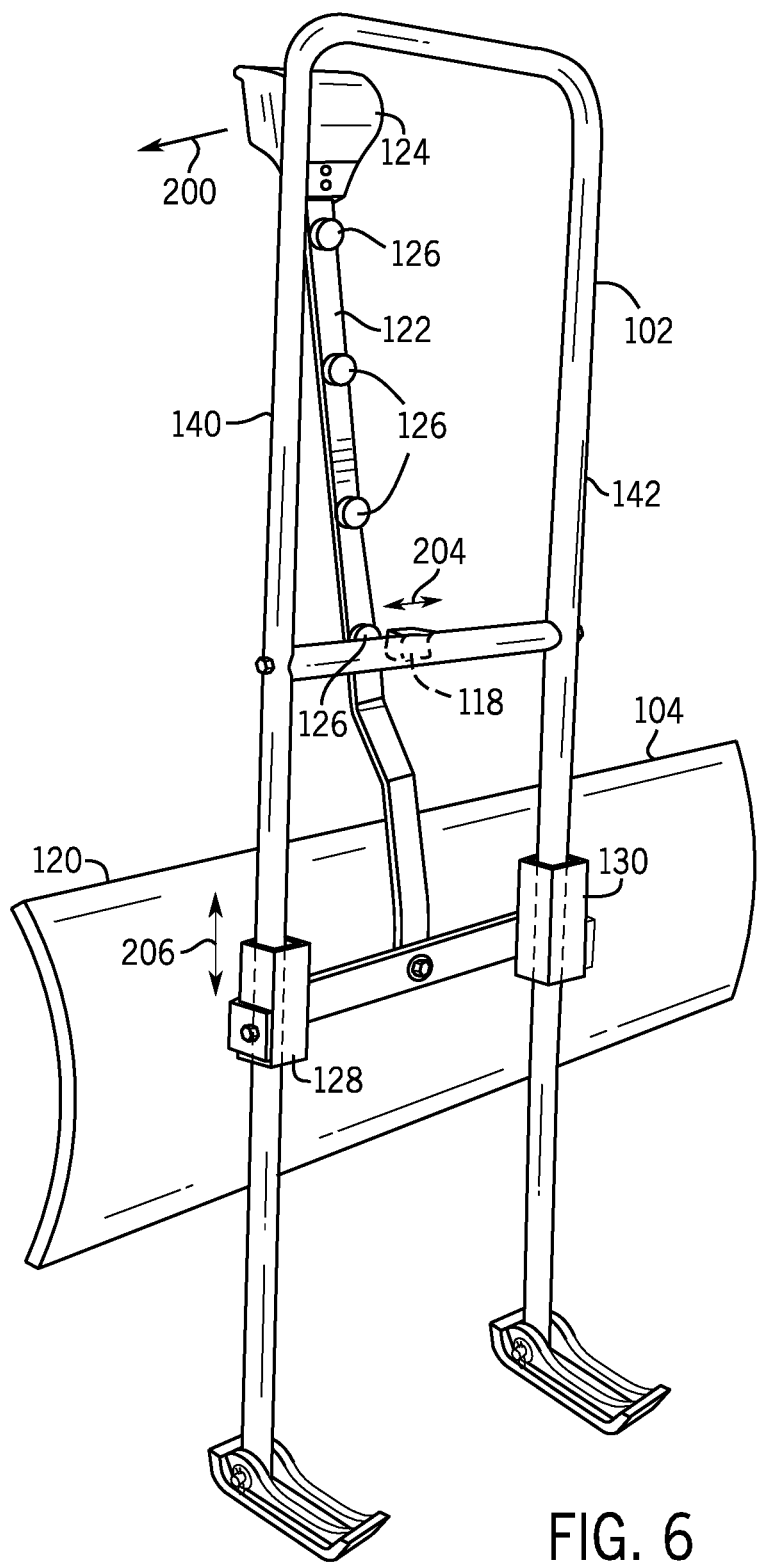
FIG. 6 is a rear perspective view of an embodiment of the present invention illustrating how shovel assembly 104 can be repositioned in relation to frame assembly 102.

Turning to FIG. 6, a rear perspective view of an embodiment of the present invention illustrating how shovel assembly 104 can be repositioned in relation to frame assembly 102 is shown. To change the position of shovel assembly 104, frame assembly attachment portion 126 is detached from shovel assembly attachment portion 118 (denoted by first arrow 204) when a user pulls handle 122 away from frame assembly 102 (denoted by second arrow 200) and then slides shovel assembly 104 downward (or upward and denoted by third arrow 206) to a desired position and reattaches a different frame assembly attachment portion 126 (or a different location of portion 126) on handle 122 to shovel assembly attachment portion 118 of frame assembly 102, thereby securing blade 120 to a new position. While the current embodiment utilizes a plurality of frame assembly attachment portions 126 along handle 122 it is contemplated portion 126 could comprise a single unit which extends along at least a section of handle 122, thereby allowing shovel assembly 104 to be repositioned in relation to frame assembly 102 utilizing a single frame assembly attachment portion 126.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. An adjustable shovel apparatus comprising:
    a frame assembly comprising a first extension, a second extension in parallel to the first extension, a third extension attached to the first extension and the second extension, a crossbar with a shovel assembly attachment portion, a first foot connected to the first extension; and a second foot connected to the second extension; and
    a shovel assembly,
    wherein a section of the shovel assembly is slidable along the frame assembly and a different section of the shovel assembly is movably attached to the frame assembly.

2. The apparatus of claim 1 wherein the third extension is perpendicular to the first extension and the second extension.

3. The apparatus of claim 1 wherein the shovel assembly attachment portion is centrally located on the crossbar.

4. The apparatus of claim 1 wherein the shovel assembly comprises:
    a handle;
    a blade;
    a rail attached to the blade;
    a first cylinder configured to be slidable along the first extension;
    a second cylinder configured to be slidable along the second extension,
    wherein the handle is attached to the rail, the first cylinder is attached to one end of the rail, and the second cylinder with attached to the other end of the rail.

5. The apparatus of claim 4 wherein the shovel assembly further comprises at least one frame assembly attachment portion fixed along the length of the handle and configured to removably attach to the shovel assembly attachment portion.

6. The apparatus of claim 4 wherein at least a portion of the blade can be adjusted to a distance of up to the location of the crossbar.

* * * * *